(12) United States Patent
Jee

(10) Patent No.: US 7,140,966 B2
(45) Date of Patent: Nov. 28, 2006

(54) TORSIONAL VIBRATION DAMPER

(75) Inventor: Tae Han Jee, Suwon (KR)

(73) Assignee: Hyundai Motor Company, Seoul (KR)

( * ) Notice: Subject to any disclaimer, the term of this patent is extended or adjusted under 35 U.S.C. 154(b) by 113 days.

(21) Appl. No.: 10/804,651

(22) Filed: Mar. 19, 2004

(65) Prior Publication Data

US 2004/0185939 A1  Sep. 23, 2004

(30) Foreign Application Priority Data

Mar. 20, 2003  (KR) ........... 10-2003-0017530
Jul. 22, 2003  (KR) ........... 10-2003-0050298

(51) Int. Cl.
*F16F 15/129* (2006.01)

(52) U.S. Cl. .................. 464/68.4; 464/68.92

(58) Field of Classification Search ........... 464/64.1, 464/66.1, 68.4, 68.8, 68.92, 68.41; 192/213, 192/213.2, 213.21, 213.3, 214, 205

See application file for complete search history.

(56) References Cited

U.S. PATENT DOCUMENTS

| | | | |
|---|---|---|---|
| 4,559,024 A * | 12/1985 | Tamura et al. ........... 464/68.4 |
| 5,289,737 A | 3/1994 | Kuhne | |
| 5,377,560 A | 1/1995 | Schierling et al. | |
| 5,380,248 A * | 1/1995 | Kraus et al. ........... 464/66.1 |
| 6,056,102 A * | 5/2000 | Ohkubo et al. ........... 192/205 |
| 6,416,416 B1 * | 7/2002 | Rohs et al. ........... 464/68.41 |
| 2001/0046898 A1 * | 11/2001 | Rohs et al. ........... 464/68.92 |
| 2002/0128074 A1 | 9/2002 | Jackel et al. | |
| 2004/0182196 A1 * | 9/2004 | Jaeckel et al. ........... 464/68.92 |

FOREIGN PATENT DOCUMENTS

| | | |
|---|---|---|
| DE | 19958813 | 12/2000 |
| EP | 0 478 106 A3 | 1/1992 |
| EP | 1231406 | 8/2002 |
| JP | 2000-320614 | 11/2000 |

* cited by examiner

*Primary Examiner*—Greg Binda
(74) *Attorney, Agent, or Firm*—Morgan Lewis & Bockius LLP

(57) ABSTRACT

A torsional vibration damper is provided which comprises a primary mass, a secondary mass, and a damping unit. The primary mass defines a ring-shaped chamber, and the ring-shaped chamber is divided into at least two portions. The secondary mass is rotatably connected to the primary mass. The damping unit couples the primary and secondary masses to each other in a rotationally elastic manner. The damping unit comprises a plurality of elastic members, a pair of end guide, and a friction member disposed between the elastic members.

15 Claims, 11 Drawing Sheets

TORSIONAL VIBRATION DAMPER

CROSS-REFERENCE TO RELATED APPLICATIONS

This application claims priority of Korean Application No. 10-2003-0017530 filed on Mar. 20, 2003, and of Korean Application No. 10-2003-0050298 filed on Jul. 22, 2003. The disclosure of both applications is incorporated fully herein by reference.

FIELD OF THE INVENTION

The present invention relates to a torsional vibration damper (i.e., a dual mass flywheel) for a vehicle.

BACKGROUND OF THE INVENTION

A dual mass flywheel (hereinafter referred to as a flywheel) is generally used for damping a torsional vibration that is generated during power transmission between an output shaft of an engine and an input shaft of a transmission. Typical prior flywheels include a first mass, a second mass, and a damping unit disposed between the first and second masses. The first mass is connected to the output shaft of the engine, and the second mass is connected to the input shaft of the transmission through a clutch mechanism.

The first and second masses are connected to each other through the damping unit such that the first and second masses can rotate relative to each other. Generally, the engine drives wheels, but the engine may be driven by an inertia force of a vehicle. Therefore, the first and second masses must be designed to relatively rotate in both directions.

When engine torque is substantially high and the vehicle is driven with a specific gear ratio, a relative rotation between the first and second masses reaches its limit. Furthermore, when the engine torque changes irregularly, the first and second masses may be dashed against a member for limiting the relative rotation of the first and second masses.

To solve such problems, the flywheel is designed to have a high level of damping characteristics.

In the prior flywheel, when the relative rotation between the first and second masses occurs, a magnitude of torque cannot be regulated. Furthermore, a damping effect of the flywheel is almost constant even when the relative rotation between the first and second masses occurs. The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Embodiments of the present invention provide a torsional vibration damper that can realize variable damping characteristics according to a rotation speed and a relative rotation of a primary mass with respect to a secondary mass.

In a preferred embodiment of the present invention, the torsional vibration damper comprises a primary mass, a secondary mass, and a damping unit. The primary mass is adapted to be coupled to an engine crankshaft for rotation about a rotational axis of the engine crankshaft, and it defines a substantially ring-shaped chamber that is divided into at least two portions. The secondary mass is relatively rotatably connected to the primary mass and connectable with a clutch. The damping unit couples the primary and secondary masses to each other in a rotationally elastic manner. The damping unit comprises a plurality of elastic members, a pair of end guides, and a wedge-shaped friction member. The elastic members are situated in series and disposed one after the other within the divided portion of the ring-shaped chamber. The end guides are slidably disposed within the divided portion of the ring-shaped chamber and support outer ends of the end elastic members among the plurality of elastic members. The wedge-shaped friction member is slidably disposed between neighboring elastic members, and it comprises an inner wedge and an outer wedge that are elastically supported by the neighboring elastic members such that the outer and inner wedges move in opposite directions.

It is preferable that the inner wedge is provided with a first slanted contacting surface, the outer wedge is provided with a second slanted contacting surface, and the inner and outer wedges contact each other through the first and second slanted contacting surfaces, so that the outer wedge is urged to move outwardly and the inner wedge is urged to move inwardly when the neighboring elastic members are compressed.

It is preferable that a mean operating radius of the elastic member supporting the outer wedge is greater than a mean operating radius of the elastic member supporting the inner wedge.

It is also preferable that the elastic member is a coil spring.

It is further preferable that a first coil spring receiving hole is formed on one side of the inner wedge and a first slanted contacting surface is formed on the other side of the inner wedge, a second coil spring receiving hole is formed on one side of the outer wedge and a second slanted contacting surface is formed on the other side of the outer wedge, and the first slanted contacting surface and the second contacting surface contact each other so that the outer wedge is urged to move outwardly and the inner wedge is urged to move inwardly when the neighboring coil springs are compressed.

It is further preferable that a bottom surface of the first coil spring receiving hole is slanted so that the bottom surface and an end surface of the coil spring are angled when the coil spring is not compressed.

It is still further preferable that the bottom surface of the first coil spring receiving hole is slanted such that an outer end portion of the coil spring contacts the bottom surface and an inner end portion of the coil spring does not contact the bottom surface when the coil spring is not compressed.

Preferably, a bottom surface of the second coil spring receiving hole is slanted so that the bottom surface and an end surface of the coil spring are angled when the coil spring is not compressed.

Further preferably, the bottom surface of the second coil spring receiving hole is slanted such that the an outer end portion of the coil spring contacts the bottom surface and an inner end portion of the coil does not contact the bottom surface when the coil spring is not compressed.

It is preferable that a groove is formed on at least one of outer surfaces of the outer and inner wedges along a circumferential direction of the ring-shaped chamber.

It is also preferable that a groove is formed on at least one of outer surfaces of the outer and inner wedges along a direction substantially perpendicular to a circumferential direction of the ring-shaped chamber.

It is preferable that the ring-shaped chamber is divided into at least two portions by a protrusion that is formed on the primary mass, and an oil passageway is formed on at least one side of the protrusion.

Preferably, the outer wedge is configured to move in a radially outward direction so that the outer wedge contacts an outer surface of the ring-shaped chamber, and the inner wedge is configured to move in a radially inward direction so that the inner wedge contract an inner surface of the ring-shaped chamber, when the elastic members are compressed.

It is preferable that at least one bushing is disposed between the primary mass and the secondary mass.

It is preferable that the ring-shaped chamber is at least partially filled with lubrication oil.

Preferably, the torsional vibration damper further comprises a drive plate that is coupled to the secondary mass and is configured to compress the damping unit when a relative rotation between the primary mass and the secondary mass occurs.

It is preferable that at least two compression fins are provided on an outer circumference of the drive plate, the compression fins compressing the damping unit when the secondary mass relatively rotates with respect to the primary mass.

In another embodiment of the present invention, the torsional vibration damper comprises a primary mass, a secondary mass, and a damping unit. The primary mass is adapted to be coupled to an engine crankshaft for rotation about a rotational axis of the engine crankshaft, and it defines a substantially ring-shaped chamber that is divided into at least two portions. The secondary mass is relatively rotatably connected to the primary mass and connectable with a clutch. The a damping unit couples the primary and secondary masses to each other in a rotationally elastic manner. The damping unit comprises a plurality of elastic members, a pair of end guides, and a wedge-shaped friction member, and a concentrated mass friction member. The elastic members are situated in series and disposed one after the other within the divided portion of the ring-shaped chamber. The end guides are slidably disposed within the divided portion of the ring-shaped chamber and support outer ends of the end elastic members among the plurality of elastic members. The wedge-shaped friction member is slidably disposed between neighboring elastic members, and it comprises an inner wedge and an outer wedge that are elastically supported by the neighboring elastic members such that the outer and inner wedges move in opposite directions. The concentrated mass friction member is slidably disposed between the neighboring elastic members and is provided with a concentrated mass at a center portion thereof.

It is preferable that the concentrated mass has a triangular section.

It is also preferable that the elastic member is a coil spring.

It is further preferable that a first coil spring receiving hole is formed on one side of the concentrated mass friction member, a second coil spring receiving hole is formed on the other side of the concentrated mass friction member, and one of the neighboring coil springs is inserted into the first coil sprig receiving hole and the other of the neighboring coil springs is inserted into the second coil spring receiving hole.

It is preferable that a bottom surface of the first coil spring receiving hole is slanted so that the bottom surface and an end surface of the coil spring is angled when the coil spring is not compressed.

It is preferable that a bottom surface of the second coil spring receiving hole is slanted so that the bottom surface and an end surface of the coil spring is angled when the coil spring is not compressed.

Preferably, a groove is formed on an outer surface of the concentrated mass friction member along a circumference direction of the ring-shaped chamber.

It is preferable that a groove is formed on an outer surface of the concentrated mass friction member along a direction substantially perpendicular to a circumferential direction of the ring-shaped chamber.

It is also preferable that the inner wedge is provided with a first slanted contacting surface, the outer wedge is provided with a second slanted contacting surface, and the inner and outer wedges contact each other through the first and second slanted contacting surfaces, so that the outer wedge is urged to move outwardly and the inner wedge is urged to move inwardly when the neighboring elastic members are compressed.

It is further preferable that the elastic member is a coil spring.

It is still further preferable that a first coil spring receiving hole is formed on one side of the inner wedge and a first slanted contacting surface is formed on the other side of the inner wedge, a second coil spring receiving hole is formed on one side of the outer wedge and a second slanted contacting surface is formed on the other side of the outer wedge, and the first slanted contacting surface and the second contacting surface contact each other so that the outer wedge is urged to move outwardly and the inner wedge is urged to move inwardly when the neighboring coil springs are compressed.

It is preferable that a bottom surface of the first coil spring receiving hole is slanted so that the bottom surface and an end surface of the coil spring are angled when the coil spring is not compressed.

It is preferable that a bottom surface of the second coil spring receiving hole is slanted so that the bottom surface and an end surface of the coil spring are angled when the coil spring is not compressed.

Preferably, a groove is formed on at least one of outer surfaces of the outer and inner wedges along a circumferential direction of the ring-shaped chamber.

It is preferable that a groove is formed on at least one of outer surfaces of the outer and inner wedges along a direction substantially perpendicular to a circumferential direction of the ring-shaped chamber.

It is preferable that the ring-shaped chamber is divided into at least two portions by a protrusion that is formed on the primary mass, and an oil passageway is formed on at least one side of the protrusion.

It is preferable that the outer wedge is configured to move in a radially outward direction so that the outer wedge contacts an outer surface of the ring-shaped chamber, and the inner wedge is configured to move in a radially inward direction so that the inner wedge contract an inner surface of the ring-shaped chamber, when the elastic members are compressed.

Preferably, at least one bushing is disposed between the primary mass and the secondary mass.

It is preferable that the ring-shaped chamber is at least partially filled with lubrication oil.

Preferably, the torsional vibration damper further comprises a drive plate that is coupled to the secondary mass and is configured to compress the damping unit when a relative rotation between the primary mass and the secondary mass occurs.

It is also preferable that at least two compression fins are provided on an outer circumference of the drive plate, the compression fins compressing the damping unit when the secondary mass relatively rotates with respect to the primary mass.

In another embodiment of the present invention, the torsional vibration damper comprises a primary mass, a secondary mass, and a damping unit. The primary mass is adapted to be coupled to an engine crankshaft for rotation about a rotational axis of the engine crankshaft, and it defines a substantially ring-shaped chamber that is divided into at least two portions. The secondary mass is relatively rotatably connected to the primary mass and connectable with a clutch. The damping unit couples the primary and secondary masses to each other in a rotationally elastic manner. The damping unit comprises a plurality of elastic members and at least one friction member disposed between the elastic members, and the elastic members have different mean operating radii.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 1:
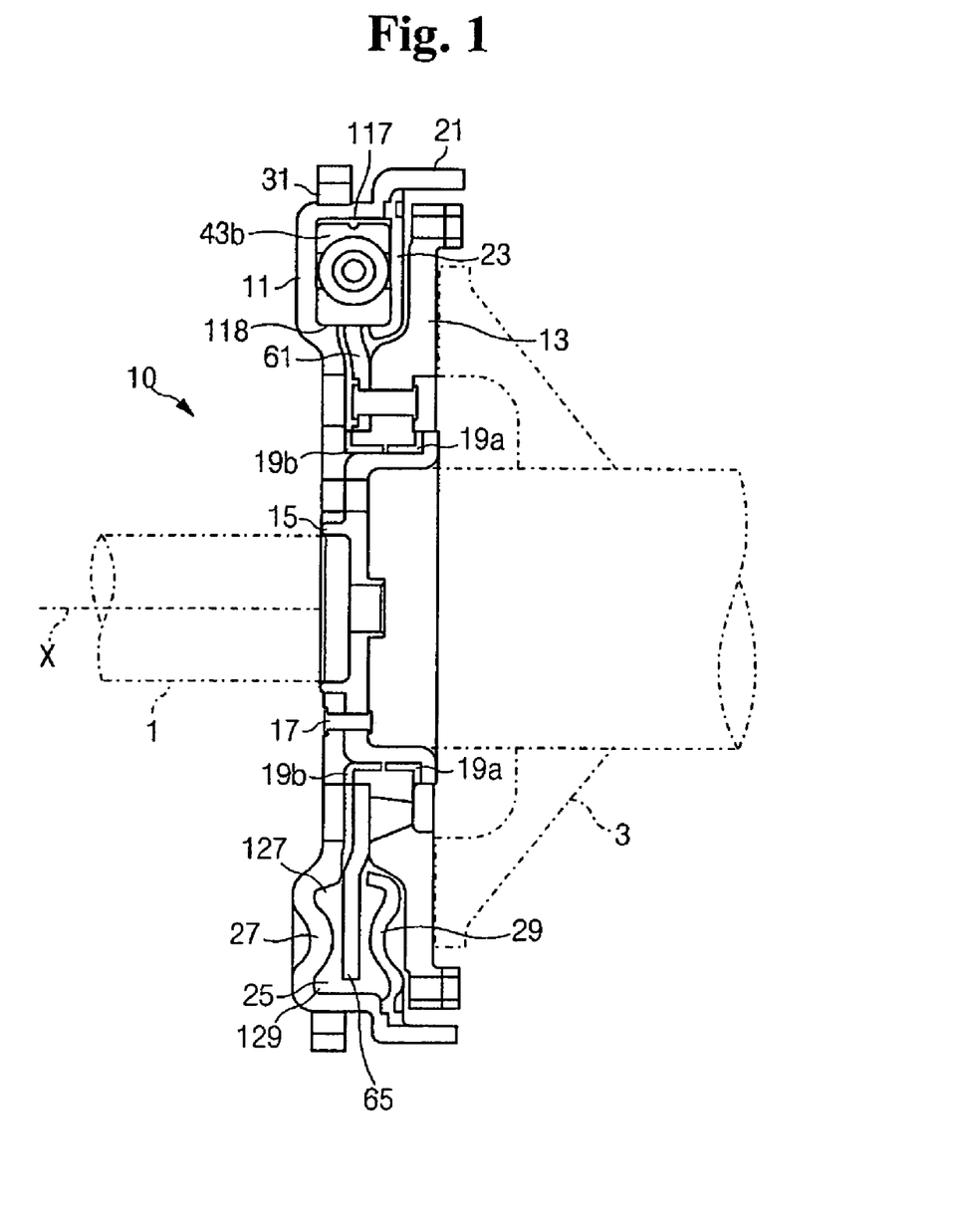
FIG. 1 is a sectional view of a torsional vibration damper according to a preferred embodiment of the present invention as viewed approximately along line A-A in FIG. 2.
Figure 2:
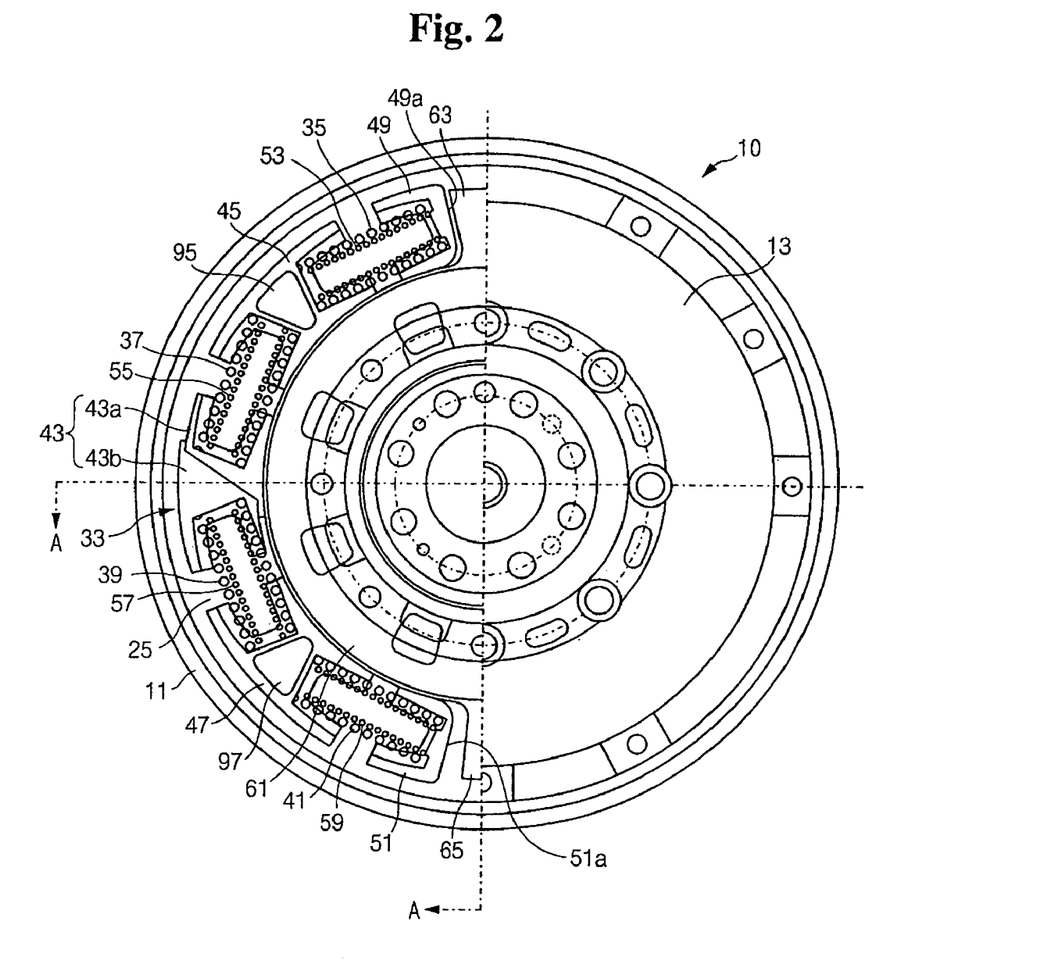
FIG. 2 is a partially broken-away plan view showing an inner structure of a torsional vibration damper according to a preferred embodiment of the present invention.

As shown in FIGS. 1 and 2, a torsional vibration damper 10 according to a preferred embodiment of the present invention is disposed between an engine (not shown) and a transmission (not shown), and plays a role to dampen torsional vibration that is generated during power transmission. A torsional vibration damper 10 according to a preferred embodiment of the present invention can be used between any power transmitting portion, instead of between the engine and the transmission.

In an exemplary embodiment, primary mass 11 is adapted to be coupled to the engine crankshaft 1 for rotation about a rotational axis "X" of the engine crankshaft 1. A secondary mass 13 is relatively rotatably connected to the primary mass and is configured to be connectable with a clutch 3. A hub 15 is coupled to the primary mass 11 through a rivet (or a bolt) 17, and the secondary mass 13 is rotatably connected to the hub 15 through bushings (or bearings) 19a and 19b, so the secondary mass 13 is rotatably connected to the primary mass 11. It is preferable that two bushings 19a and 19b are used, in order to disperse torsional stress to prevent metamorphoses of the bushings 19a and 19b.

Referring to FIGS. 1 and 2, the primary mass 11 has a shape of a circular plate. A folded edge portion 21 is provided around the edge of the primary mass 11, and a cover 23 is coupled to the edge portion 21 to define a ring-shaped chamber 25 around the circumference of the primary mass 11.

The ring-shaped chamber 25 is divided at least two portions by a first protrusion 27 that is formed on the primary mass 11 and a second protrusion 29 that is formed on the cover 23. For example, in the embodiment of FIG. 2, the ring-shaped chamber 25 is divided into two portions, with a pair of protrusions 27 and 29 at the top and bottom of damper 10. In the plan view of FIG. 2 the protrusions are not visible, but they are positioned around compression fins 63 and 65 as shown in FIG. 1 and described below. In alternative embodiments, chamber 25 can be divided into more than two portions by using more than two pairs of protrusions.

The ring-shaped chamber 25 is preferably at least partially filled with lubrication oil. The first and second protrusions 27 and 29 are preferably formed near a radial center portion of the ring-shaped chamber 25 so that lubrication oil passageways 127 and 129 are formed on both sides of the first and second protrusions 27 and 29. Therefore, lubrication oil can move between the divided portions of the ring-shaped chamber 25 through the lubrication oil passageways 127 and 129.

A ring gear 31 is formed in an outer circumference of the primary mass 11. The ring gear 31 is for connection with a start motor (not shown).

A damping unit 33 is disposed in each divided portion of the ring-shaped chamber 25. The damping unit 33 couples the primary mass 11 and the secondary mass 13 to each other in a rotationally elastic manner. The damping unit 33 elastically supports at least one of the first and second protrusions 27 and 29. If the first and second protrusions 27 and 29 formed on the primary mass 11 are elastically supported by the damping unit 33, a rotational force can be transmitted between the primary and secondary masses 11 and 13.

As shown in FIG. 2, the damping unit 33 includes coil springs 35, 37, 39, and 41; a wedge-shaped friction member 43; concentrated mass friction members 45 and 47; and a pair of end guides 49 and 51. The friction members 43, 45, and 47 have direct effects on damping characteristics of the damping unit 33, so they can be called a hysteresis element. Auxiliary coil springs 53, 55, 57, and 59 are respectively disposed within the coil springs 35, 37, 39, and 41. Therefore, each pair of the springs can provide a two-step damping coefficient. Instead of the coil springs 35, 37, 39, and 41, and the auxiliary coil springs 53, 55, 57, and 59, other suitable elastic members that can be compressed and provide an elastic force can be used.

Outer ends 49a and 51a of end guides 49 and 51, respextively, are supported by the first and second protrusions 27 and 29. The coil springs 35, 37, 39, and 41 are situated in series and disposed one after the other within each portion of ring-shaped chamber 25. The end guides 49 and 51 are slidably disposed within the ring-shaped chamber 25, and the end guides 49 and 51 support outer ends of the end coil springs 35 and 41 among the coil springs 35, 37, 39, and 41.

Figure 15:
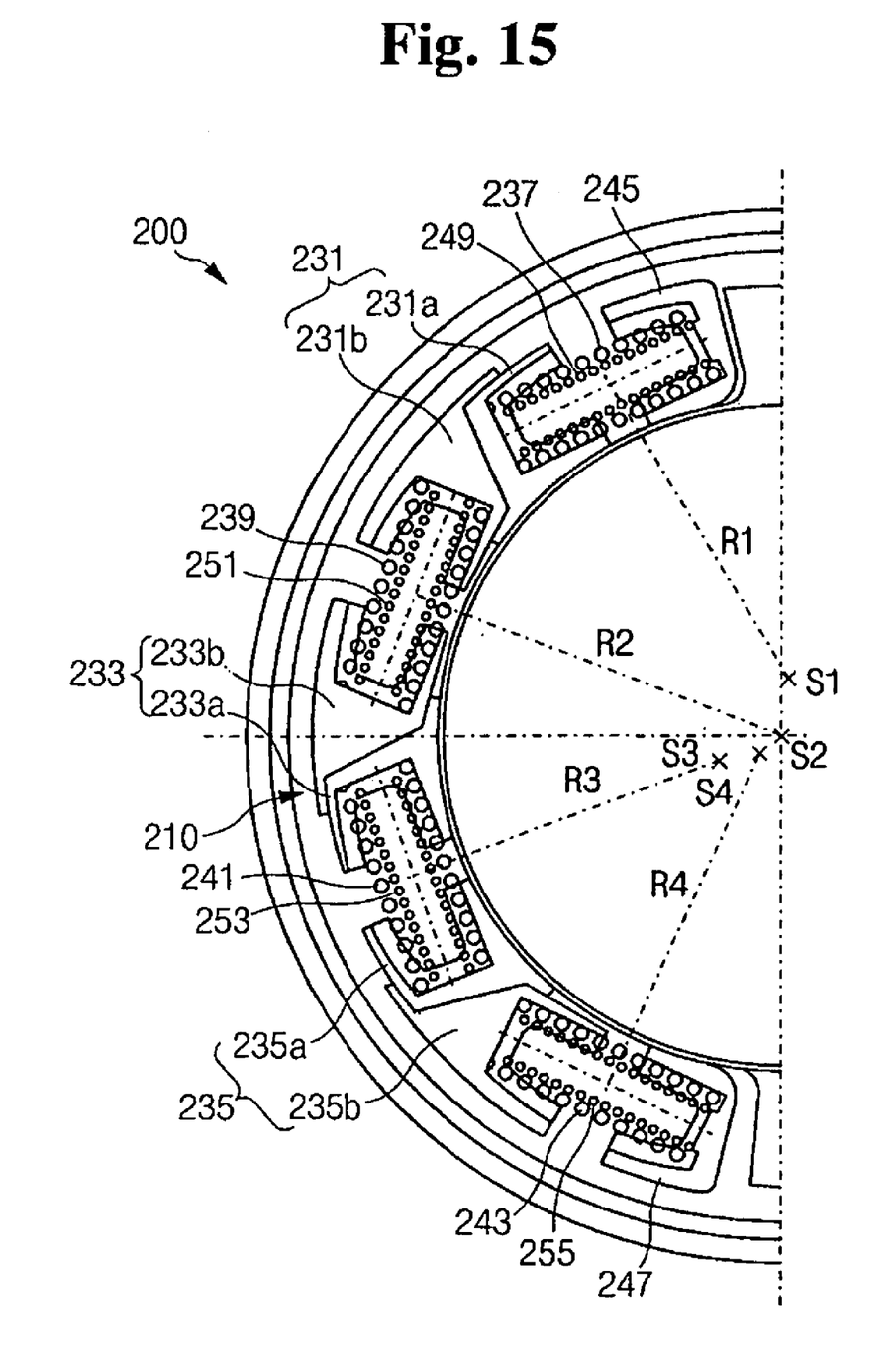
FIG. 15 shows a torsional vibration damper according to another embodiment of the present invention.

As shown in FIG. 2, it is preferable that the wedge-shaped friction member 43 and the concentrated mass friction member 45 (or 47) are alternately disposed. However, as shown in FIG. 15, it is also preferable that only the wedge-shaped friction member can be used.

As shown in FIGS. 1 and 2, a drive plate 61 is fixedly coupled to the secondary mass 13, such that the drive plate 61 can compress the damping unit 33.

Figure 3:
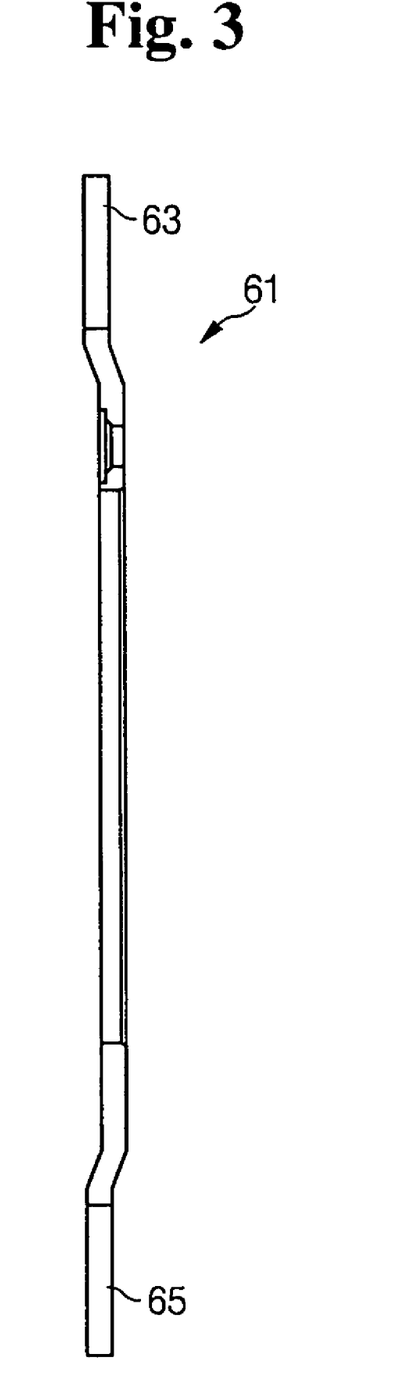
FIGS. 3 and 4 show a drive plate of a torsional vibration damper according to a preferred embodiment of the present invention.
Figure 4:
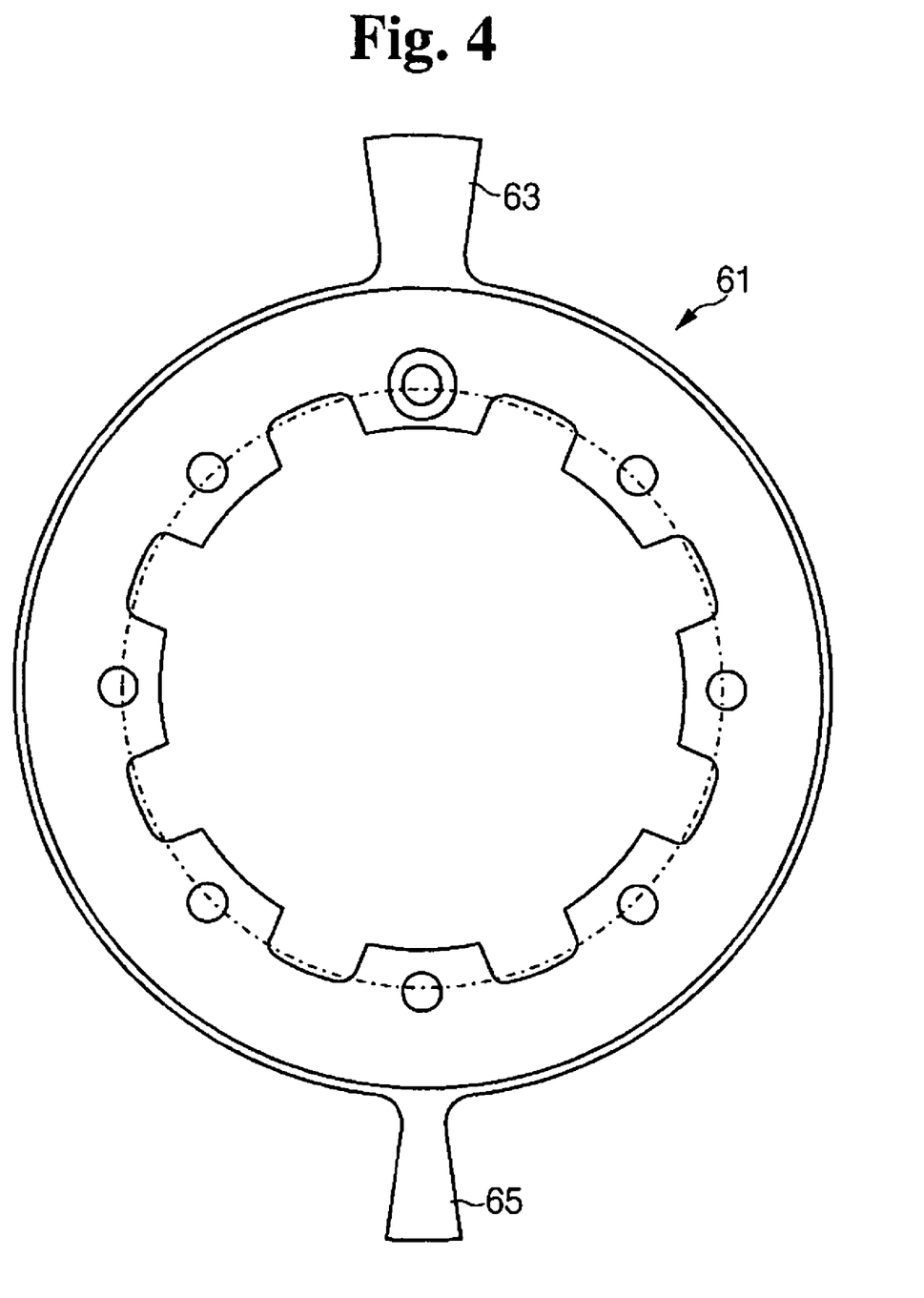

As shown in FIGS. 3 and 4, the drive plate 61 has a ring shape, and first and second compression fins 63 and 65 are oppositely provided on an outer circumference of the drive plate 61. The compression fins 63 and 65 are positioned within the ring-shaped chamber 25, and they have shapes and sizes for moving in the ring-shaped chamber 25.

The compression fins 63 and 65 are disposed between the protrusions 27 and 29 when power is not being transmitted in the torsional vibration damper 10. (See FIG. 1) When power transmission occurs in the torsional vibration damper 10, the compression fins 63 and 65 compress the end guide 49 (or 51). That is, when the drive plate 61 relatively rotates with respective to the primary mass 11 in a counter clockwise direction in FIG. 2, the first compression fin 63 compresses the end guide 49 and the second compression fin 65 compresses an end guide (not shown) that is disposed near the end guide 51 in the other divided portion of the ring-shaped chamber 25. The end guide 51 is supported by the first and second protrusions 27 and 29, so that damping between the primary and secondary masses 11 and 13 can occur. On the other hand, when the drive plate 61 relatively rotates with respective to the primary mass 11 in a clockwise direction in FIG. 2, the second compression fin 65 compresses the end guide 51 and the first compression fin 63 compresses an end guide (not shown) that is disposed near the end guide 49 in the other divided portion of the ring-shaped chamber 25. The end guide 49 is then supported by the first and second protrusions 27 and 29, so that a damping between the primary and second masses 11 and 13 can occur.

As shown in FIG. 4, the first and second compression fins 63 and 65 have different widths, so that the damping units in the two divided portions of the ring-shaped chamber 25 are sequentially compressed. That is, the first compression fin 63 that has a wider width firstly compresses one of the two damping units that are disposed within each divided portions of the ring-shaped chamber 25, and the second compression fin 65 that has a narrower width secondly compresses the other damping unit. Accordingly, two-step damping characteristics are realized. Because the two damping units are sequentially compressed by the compression fins 63 and 65 that have different widths, shock is decreased when compared with the case that two damping units are simultaneously compressed.

Figure 5:
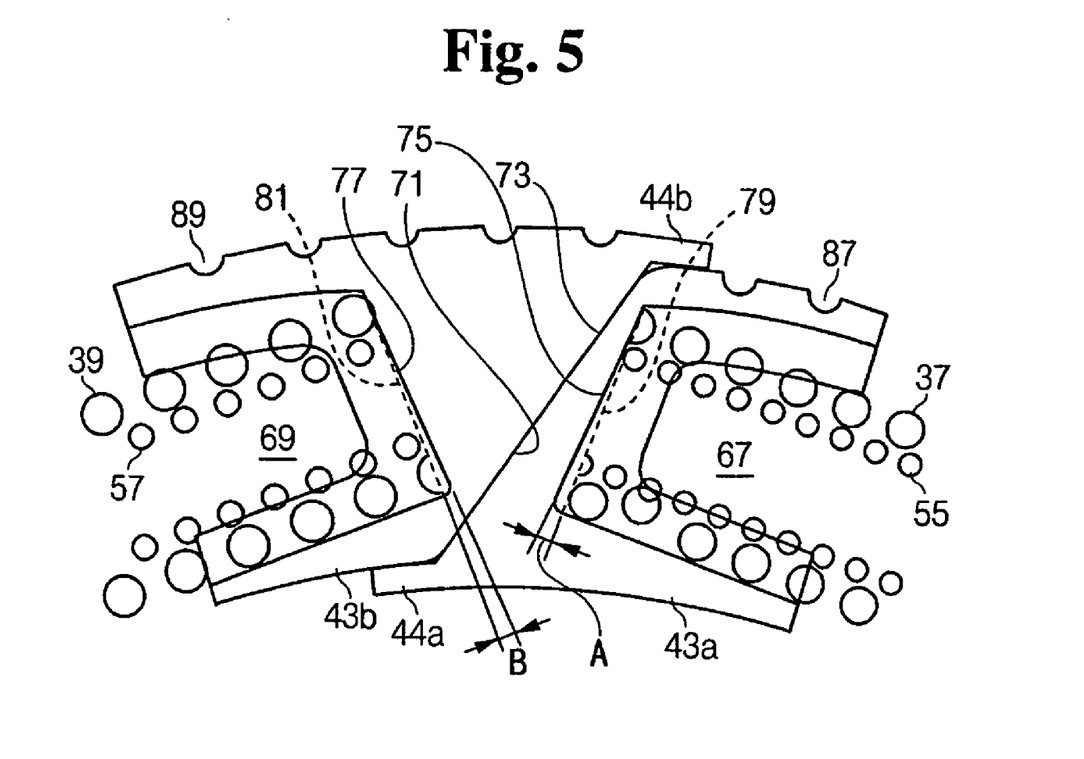
FIGS. 5 to 7 show a wedge-shaped friction member of a torsional vibration damper according to a preferred embodiment of the present invention.
Figure 6:
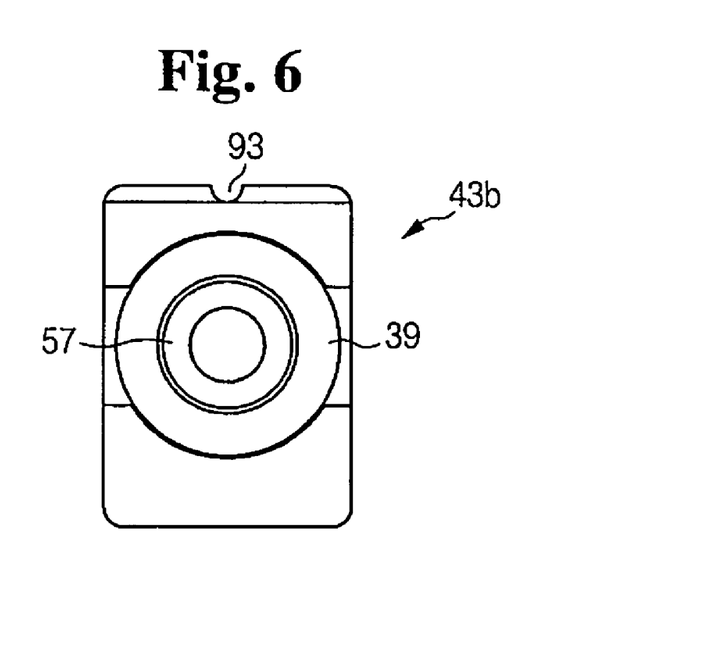

As shown in FIGS. 2 and 5, the wedge-shaped friction member 43 includes an inner wedge 43*a* and an outer wedge 43*b*. As shown in FIG. 5, a coil spring receiving hole 67 is formed in one side of the inner wedge 43*a*, and a slanted contacting surface 73 is formed in the other side of the inner wedge 43*a*. The coil spring 37 and the auxiliary coil spring 55 are inserted into the coil spring receiving hole 67 of the inner wedge 43*a*. Similarly, a coil spring receiving hole 69 is formed in one side of the outer wedge 43*b*, and a slanted contacting surface 71 is formed in the other side of the outer wedge 43*b*. The coil spring 39 and the auxiliary coil spring 57 are inserted into the coil spring receiving hole 69 of the outer wedge 43*b*, as shown in FIGS. 5 and 6. The inner and outer wedges 43*a* and 43*b* are disposed such that the two contacting surfaces 73 and 71 face each other, as shown in FIG. 5.

If the coil springs 37 and 39 are compressed, the outer wedge 43*b* rides up the slanted contacting surface 73 of the inner wedge 43*a*, and the inner wedge 43*a* rides down the slanted contacting surface 71 of the outer wedge 43*b*. Accordingly, if the coil springs 37 and 39 are compressed, the inner wedge 43*a* moves in a radially inward direction so that the inner wedge 43*a* contacts an inner surface 118 of the ring-shape chamber 25 to generate a friction force therebetween, and the outer wedge 43*b* moves in a radially outward direction so that the outer wedge 43*b* contacts an outer surface 117 of the ring-shaped chamber 25 to generate a friction force therebetween.

As shown in FIG. 5, protrusions 44*a* and 44*b* are respectively formed along an inner end of the slanted contacting surface 73 of the inner wedge 43*a* and along an outer end of the slanted contacting surface 71 of the outer wedge 43*b*. Relative movements of the inner and outer wedges 43*a* and 43*b* are restricted by the protrusions 44*a* and 44*b*. In another embodiment of the present invention, protrusions may not be formed on the slanted contacting surfaces 71 and 73.

Friction force between the wedge-shaped friction member 43 and the primary mass 11 goes up as a compression degree of the coil springs 37 and 39 goes up and as the relative rotation between the primary mass 11 and the secondary mass 13 increases. That is, the magnitude of the friction force generated by the wedge-shaped friction member 43 is proportional to the relative rotation between the primary and secondary masses 11 and 13. By regulating an angle of the slanted contacting surfaces 73 and 71 of the inner and outer wedges 43*a* and 43*b*, a desired friction force can be obtained.

Furthermore, as shown in FIG. 5, a bottom surface 75 of the coil spring receiving hole 67 of the inner wedge 43*a* is slanted, so that the bottom surface 75 and an end surface 79 of the coil springs 37 and 55 are angled with an angle of A. Similarly, a bottom surface 77 of the coil spring receiving hole 69 of the outer wedge 43*b* is slanted, so that the bottom surface 77 and an end surface 81 of the coil springs 39 and 57 are angled with an angle of B. That is, in a state that the coil springs 37 and 55 are not compressed, outer portions of the coil springs 37 and 55 contact the bottom surface 75 of the coil spring receiving hole 67, and an inner portion of the coil springs 37 and 55 do not contact the bottom surface 75 of the coil spring receiving hole 67. Similarly, in a state that the coil springs 39 and 57 are not compressed, outer portions of the coil springs 39 and 57 contact the bottom surface 77 of the coil spring receiving hole 69, and an inner portion of the coil springs 39 and 57 do not contact the bottom surface 77 of the coil spring receiving hole 69.

If the coil springs 37 and 39 are compressed, the coil springs 37 and 39 are bent such that center portions thereof move toward a center of the primary mass 11. On the other hand, when the torsional vibration damper 10 rotates, a centrifugal force acts on the coil springs 37 and 39 so that the coil springs 37 and 39 are bent by the centrifugal force such that the center portions thereof move outwardly. That is, the bending force compensates the centrifugal force. Consequently, in this embodiment, the coil springs 37 and 39 do not bend even at a high rotational speed.

Figure 7:
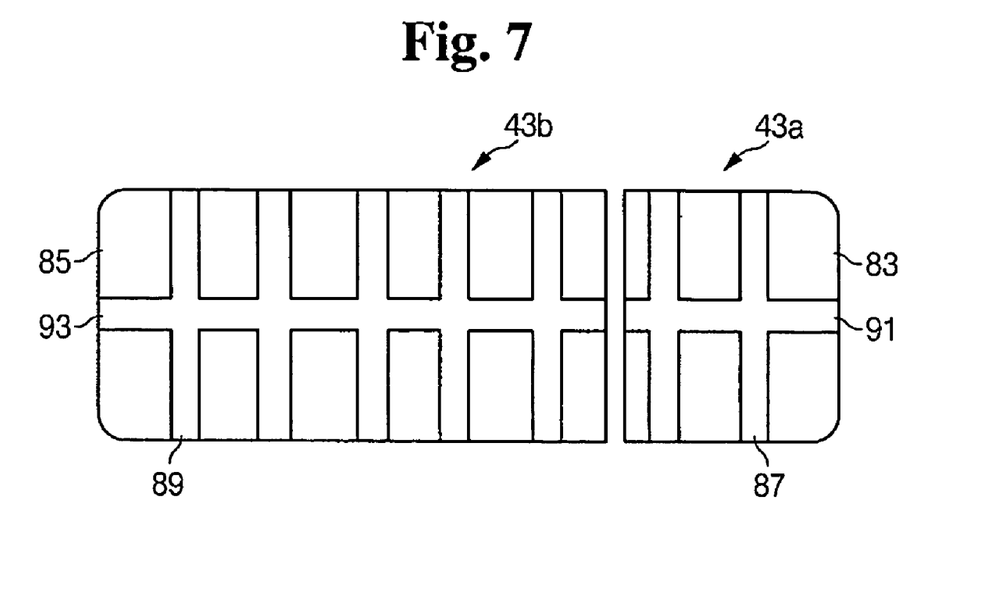

As shown in FIGS. 5 to 7, at least one first groove 87 and at least one second groove 91 are formed on an outer surface 83 of the inner wedge 43*a*, and at least one first groove 89 and at least one second groove 93 are formed on an outer surface 85 of the outer wedge 43b. The second grooves 91 and 93 are formed along a circumferential direction of the ring-shaped chamber 25, and the first grooves 87 and 89 are formed to be perpendicular to the second grooves 91 and 93. The first grooves 87 and 89 scrape a lubrication oil film existing at an outer surface 117 of the ring-shaped chamber 25. Consequently, a thickness of the lubrication oil film can be maintained to be constant. The second grooves 91 and 93 play a role of a lubrication oil passageway. Accordingly, the lubrication oil can be evenly dispersed in the ring-shaped chamber 25. The wedge-shaped friction member 43 generates a friction force that is proportional to a degree of the compression of the coil springs 37 and 39.

Figure 8:
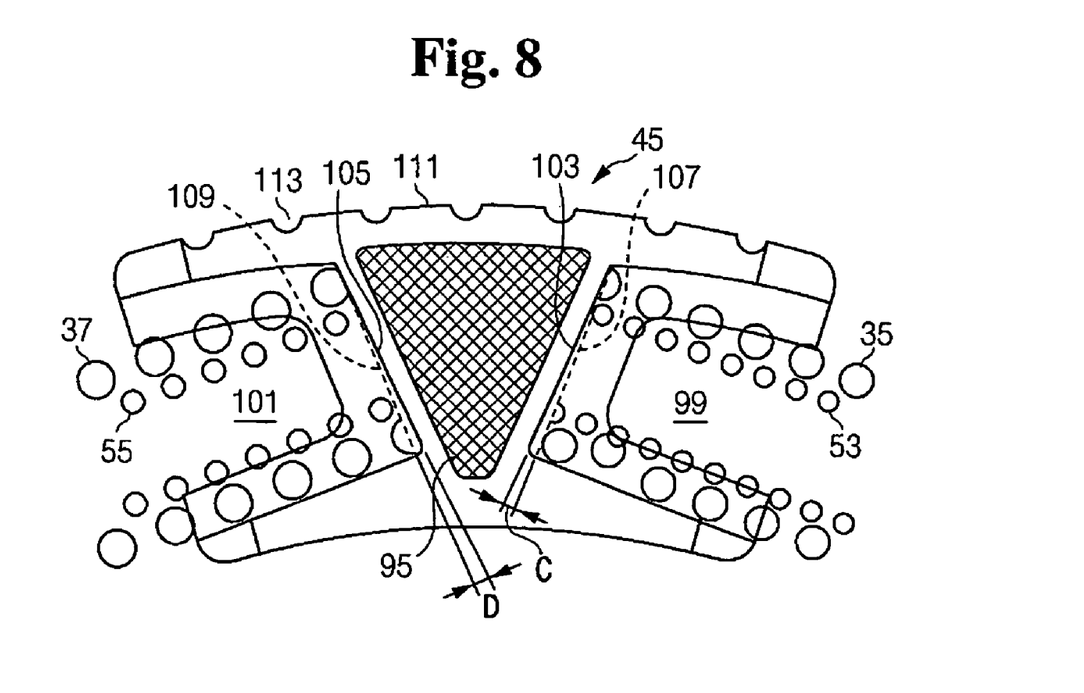
FIGS. 8 to 10 show a concentrated mass friction member of a torsional vibration damper according to a preferred embodiment of the present invention.
Figure 9:
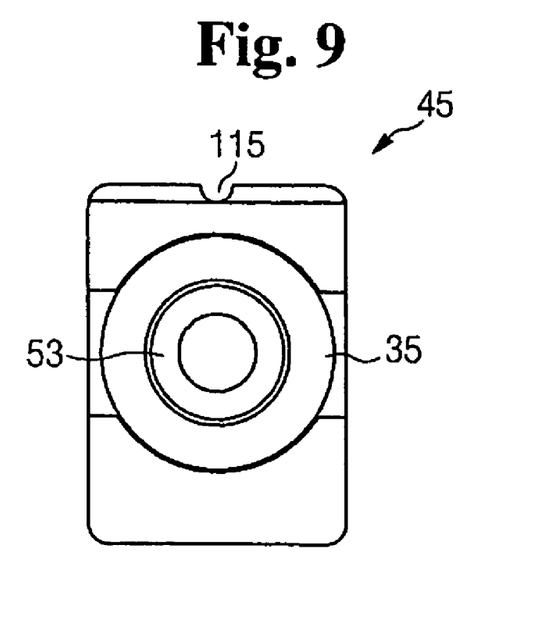
Figure 10:
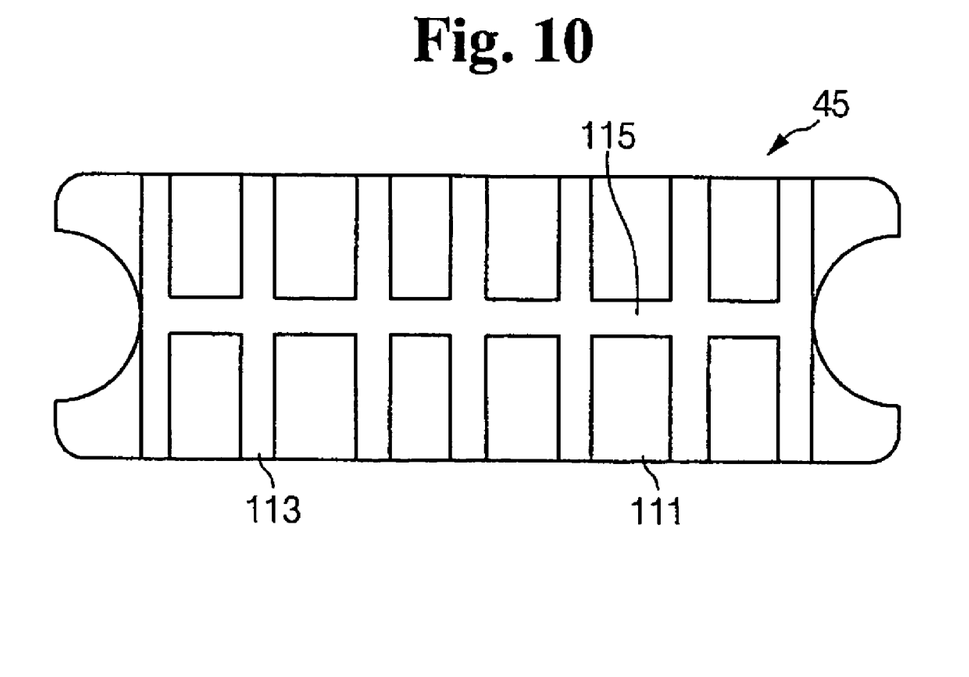

As shown in FIG. 2, the concentrated mass friction elements 45 and 47 are disposed on each side of the wedge-shaped friction element 43. The concentrated mass friction elements 45 and 47 respectively include concentrated masses 95 and 97 at center portions thereof. It is preferable that the concentrated masses 95 and 97 have a triangular shape. However, it is also possible that the concentrated masses 95 and 97 have one of various shapes such as a circle and a rectangle. The concentrated mass friction member 45 is shown in FIGS. 8 to 10. However, the concentrated mass friction member 47 has the same structure.

As shown in FIGS. 8 and 9, the concentrated mass 95 is disposed at a substantially at a center portion of the concentrated mass friction member 45, and coil spring receiving holes 99 and 101 are formed on both sides of the concentrated mass friction member 45. As shown in FIG. 8, the coil spring 35 and the auxiliary coil spring 53 are inserted into the coil spring receiving hole 99, and the coil spring 37 and the auxiliary coil spring 55 are inserted into the coil spring receiving hole 101. A bottom surface 103 of the coil spring receiving hole 99 is slanted, so that the bottom surface 103 and an end surface 107 of the coil spring 35 and the auxiliary coil spring 53 are angled with an angle of C. Similarly, a bottom surface 105 of the coil spring receiving hole 101 is slanted, so that the bottom surface 105 and an end surface 109 of the coil spring 37 and the auxiliary coil spring 55 are angle with an angle of D. Consequently, due to these structures, the coil springs 35 and 37 can be prevented from being bent by centrifugal forces while the torsional vibration damper 10 rotates.

As shown in FIG. 10, at least one first groove 113 and a second groove 115 are formed on an outer surface 111 of the concentrated mass friction member 45. The second groove 115 is formed along a circumferential direction of the ring-shaped chamber 25, and the first groove 113 is formed to be perpendicular to the second groove 115. The first groove 113 scrapes a lubrication oil film on an outer surface of the ring-shaped chamber 25 so that a thickness of the lubrication oil film can be maintained to be constant, and the second groove 115 plays a role of a lubrication oil passageway.

If the torsional vibration damper 10 operates (rotates), a centrifugal force acts on the concentrated mass friction member 95. The concentrated mass friction member 45 is thrust toward a radially outward direction of the primary mass 11. Accordingly, friction occurs between the outer surface 117 of the ring-shaped chamber 25 and the outer surface 111 of the concentrated mass friction member 45. Because the friction force is proportional to a rotation speed of the torsional vibration damper 10, the concentrated mass friction member 45 can realize a damping characteristic proportional to the rotation speed of the torsional vibration damper 10.

Figure 11:
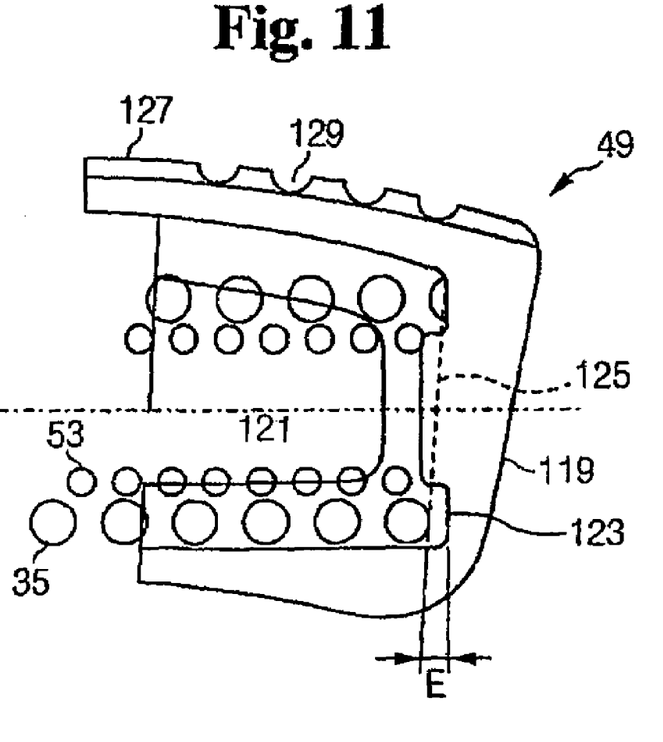
FIGS. 11 to 13 show an end guide of a torsional vibration damper according to a preferred embodiment of the present invention.
Figure 12:
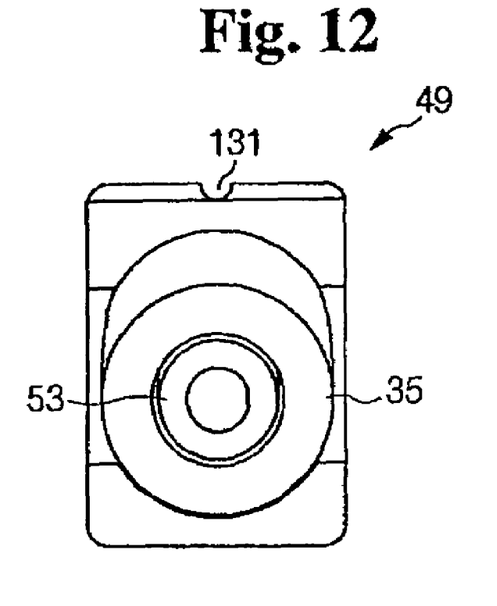
Figure 13:
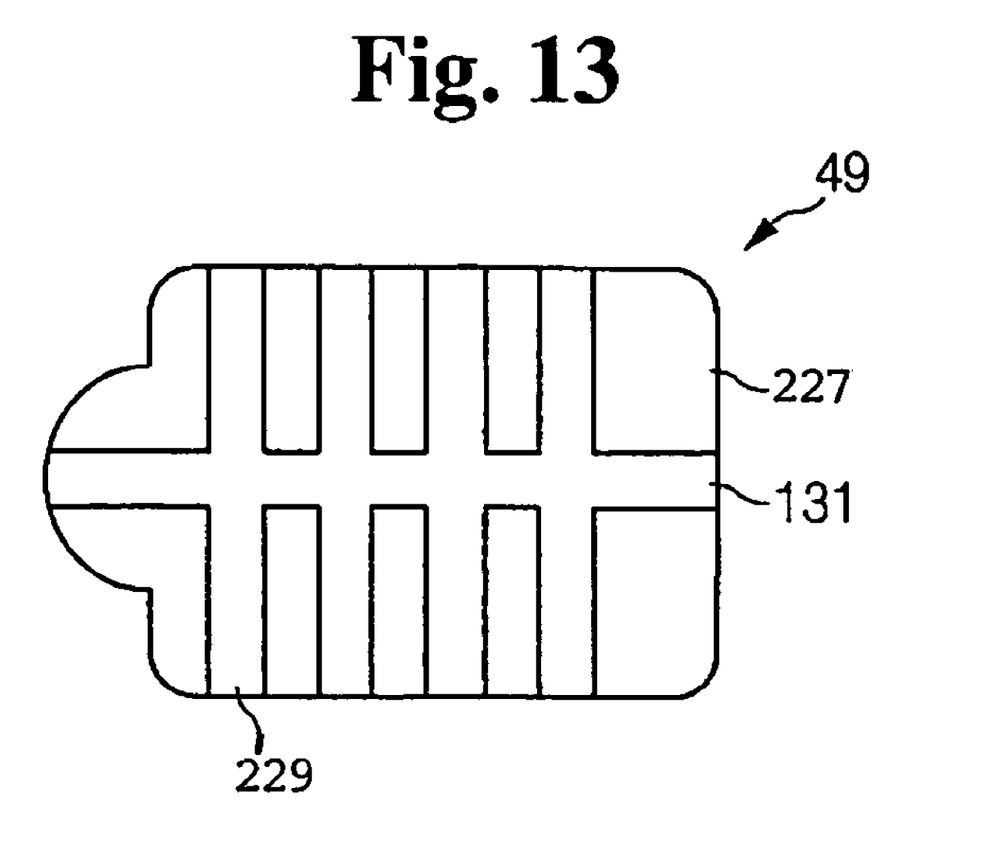

Referring to FIGS. 11 to 13, the end guide 49 will be explained. The end guide 51 is symmetric with the end guide 49, so explanations for the end guide 51 will be omitted.

A contacting surface 119 is formed on one side of the end guide 49, and a coil spring receiving hole 121 is formed on the other side thereof. The contacting surface 119 contacts the first protrusion 27 of the primary mass 11 and the second protrusion 29 of the cover 23. When the drive plate 61 relatively rotates with respect to the primary mass 11, the contacting surface 119 contacts the first compression fin 63 of the drive plate 61. A bottom surface 123 of the coil spring receiving hole 121 is slanted, so that the bottom surface 123 and an end surface 125 of the coil spring 35 are angled with an angle of E, i.e., an outer portion of the coil spring 35 contacts the bottom surface 123 and an inner portion of the coil spring 35 does not contact the bottom surface, while the coil spring 35 is not compressed. Accordingly, when the coil is compressed, the outer portion is firstly compressed. Therefore, due to this structure, the coil spring 35 can be prevented from being bent by a centrifugal force when the torsional vibration damper 10 rotates.

At least one first groove 229 and a second groove 131 are formed on an outer surface 227 of the end guide 49. The second groove 131 is formed along a circumferential direction of the ring-shaped chamber 25, and the first groove 229 is formed to be perpendicular to the second groove 131. The first groove 229 scrapes a lubrication oil film on the outer surface 117 of the ring-shaped chamber 25 so that a thickness of the lubrication oil film can be maintained to be constant, and the second groove 131 plays a role of a lubrication oil passageway. As stated in the above, the damping unit 33 is disposed in the divided portion of the ring-shaped chamber 25, and it is compressed when a relative rotation occurs between the primary and auxiliary masses 11 and 13, thereby performing a damping action.

Figure 14:
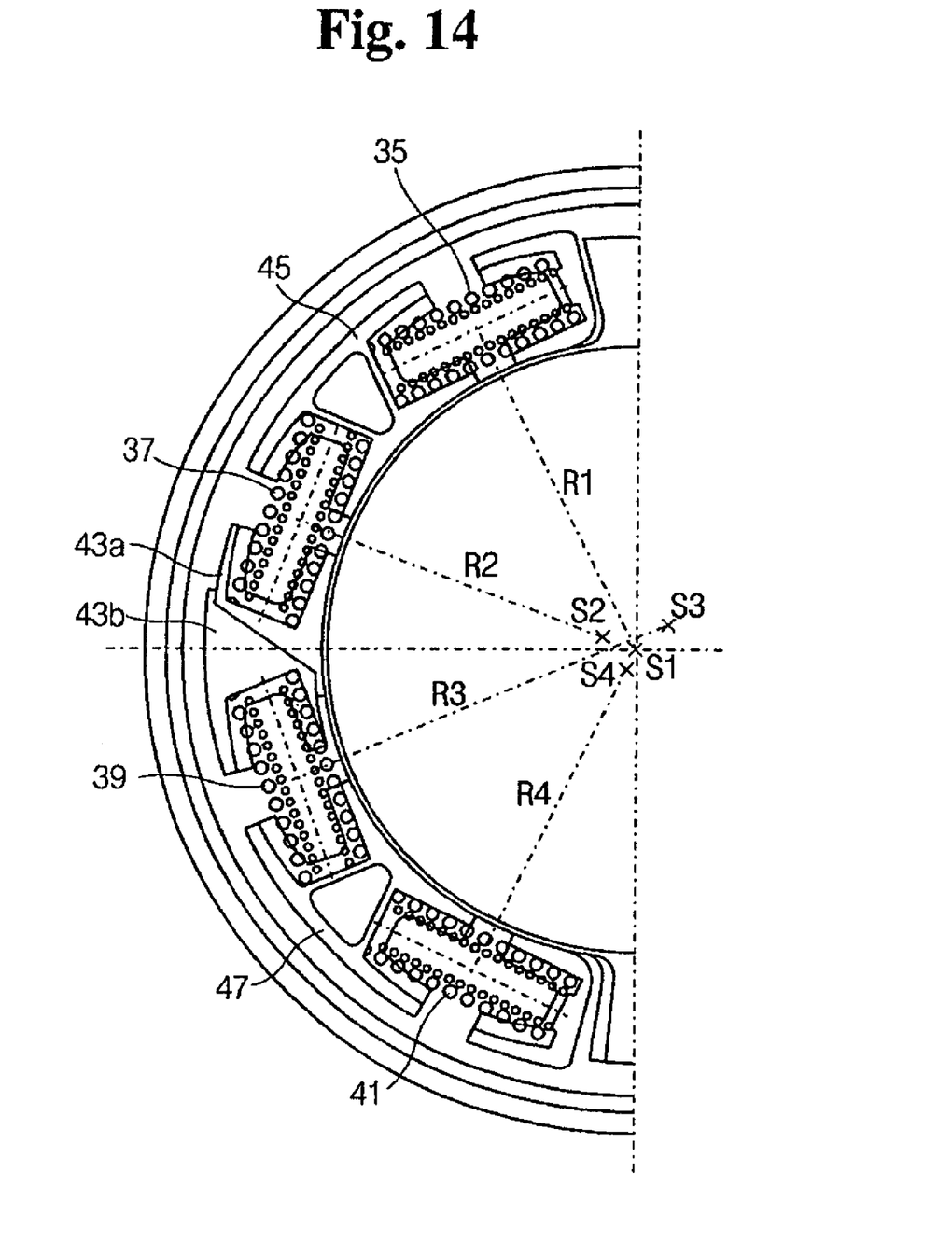
FIG. 14 shows operating centers and mean operating radii of the damping units of the torsional vibration damper of FIG. 2.

In FIG. 14, operating centers S1, S2, S3, and S4 and mean operating radii R1, R2, R3, and R4 of the coil springs 35, 37, 39, and 41 of the damping unit 33 of FIG. 2 are shown. The operating center means a center position of a locus of the longitudinal center of the coil spring when the coil springs 35, 37, 39, and 41 move within the ring-shaped chamber 25, and the mean operating radius means a distance between the operating center position and the longitudinal center of the coil spring.

As shown in FIG. 14, the mean operating radius R3 of the coil spring 39 is greater than the mean operating radius R2 of the coil spring 37, and the mean operating radius R1 of the coil spring 35 and the mean operating radius R4 of the coil spring 41 are between R2 and R3. That is, the mean operating radius R3 of the coil spring 39 supporting the outer wedge 43b is greater than the mean operating radius R2 of the coil spring 37 supporting the inner wedge 43a. Furthermore, the operating centers S1, S2, S3, and S4 of the coil spring 35, 37, 39, and 41 are different from each other.

Because the operating centers and the mean operating radii of the coil springs 35, 37, 39, and 41 are different, the coil springs 35, 37, 39, and 41 are not compressed at the same time and their compression procedures are different from each other, so the hysteresis effect can be realized. Consequently, by regulating a contacting angle of the inner wedge 43a and the outer wedge 43b and the operating centers and the mean operating radii of the coil springs 35, 37, 39, and 41, a desired hysteresis effect can be realized.

FIG. 15 shows a torsional vibration damper 200 according to another embodiment of the present invention. In this embodiment, a damping unit 210 of the torsional vibration damper 200 includes at least one wedge-shaped friction member without the concentrated mass friction member. In this embodiment, the primary mass, the secondary mass, and drive plate are substantially as in the above-stated embodiment of FIGS. 1 to 14, so detailed explanations for the same will be omitted.

The damping unit 210 includes three wedge-shaped friction members 231, 233, and 235, four coil springs 237, 239, 241, and 243, and a pair of end guides 245 and 247. Auxiliary coil springs 249, 251, 253, and 255 are disposed within the coil springs 237, 239, 241, and 243.

Each of the wedge-shaped friction members 231, 233, and 235 includes a pair of wedges, i.e., inner and outer wedges 231a and 231b, inner and outer wedges 233a and 233b, and inner and outer wedges 235a and 235b. Structures and configurations of the wedge-shaped friction members 231, 233, and 235 are substantially equal to the wedge-shaped friction member of the torsional vibration damper of FIGS. 1 to 14. So, a detailed explanation for the same will be omitted. The inner and outer wedges 231a, 231b, 233a, 233b, 235a, and 235b are disposed as shown in FIG. 5, operating centers S1, S2, S3, and S4 of the coil springs 237, 239, 241, and 243 are shown in FIG. 15.

A mean operating radius R2 of the coil spring 239 is greatest. A mean operating radius R1 of the coil spring 237 and a mean operating radius R3 of the coil spring 241 are less than a mean operating radius R4 of the coil spring 243, and R3 is less than R1. That is, the mean operating radius of the coil spring supporting the outer wedge is greater than that of the coil spring supporting the inner wedge. Because the operating centers S1, S2, S3, and S4 and the mean operating radii R1, R2, R3, and R4 are different from each other, a hysteresis effect can be obtained during the compression of the coil springs 237, 239, 241, and 243.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

According to the torsional vibration damper according to the embodiments of the present invention, damping effects according to the rotational speed and the relative rotation angle.

Furthermore, because the mean operating radii of the coil springs are different, a sequential hysteresis effect can be obtained.

What is claimed is:

1. A torsional vibration damper, comprising:
   a primary mass adapted to be coupled to an engine crankshaft for rotation about a rotational axis of the engine crankshaft, the primary mass defining a substantially ring-shaped chamber that is divided into at least two portions;
   a secondary mass relatively rotatably connected to the primary mass and connectable with a clutch; and
   a damping unit for coupling the primary and secondary masses to each other in a rotationally elastic manner, wherein the damping unit comprises:
   a plurality of elastic members situated in series and disposed one after the other within the divided portions of the ring-shaped chamber;
   a pair of end guides slidably disposed within each divided portion of the ring-shaped chamber and supporting outer ends of the end elastic members among the plurality of elastic members; and
   a wedge-shaped friction member disposed between neighboring elastic members, the wedge-shaped friction member comprising an inner wedge and an outer wedge, wherein the inner wedge and the outer wedge are in slidable contact with one another; and are elastically supported by the neighboring elastic members such that the outer and inner wedges move in opposite directions;
   wherein the inner wedge is provided with a first slanted contacting surface, the outer wedge is provided with a second slanted contacting surface, and the inner and outer wedges contact each other through the first and second slanted contacting surfaces, so that the outer wedge is urged to move outwardly and the inner wedge is urged to move inwardly when the neighboring elastic members are compressed;
   wherein a mean operating radius of the elastic member supporting the outer wedge is greater than a mean operating radius of the elastic member supporting the inner wedge.

2. The torsional vibration damper of claim 1, wherein each of the elastic members comprises a coil spring.

3. The torsional vibration damper of claim 2, wherein a first coil spring receiving hole is formed on one side of the inner wedge and the first slanted contacting surface is formed on the other side of the inner wedge, and wherein a second coil spring receiving hole is formed on one side of the outer wedge and the second slanted contacting surface is formed on the other side of the outer wedge.

4. The torsional vibration damper of claim 3, wherein a bottom surface of the first coil spring receiving hole is slanted so that the bottom surface and an end surface of the coil spring are angled when the coil spring is not compressed.

5. The torsional vibration damper of claim 4, wherein the bottom surface of the first coil spring receiving hole is slanted such that an outer end portion of the coil spring contacts the bottom surface and an inner end portion of the coil spring does not contact the bottom surface when the coil spring is not compressed.

6. The torsional vibration damper of claim 3, wherein a bottom surface of the second coil spring receiving hole is slanted so that the bottom surface and an end surface of the coil spring are angled when the coil spring is not compressed.

7. The torsional vibration damper of claim 6, wherein the bottom surface of the second coil spring receiving hole is slanted such that the an outer end portion of the coil spring contacts the bottom surface and an inner end portion of the coil does not contact the bottom surface when the coil spring is not compressed.

8. The torsional vibration damper of claim 1, wherein a groove is formed on at least one of outer surfaces of the outer and inner wedges along a circumferential direction of the ring-shaped chamber.

9. The torsional vibration damper of claim 1, wherein a groove is formed on at least one of outer surfaces of the outer and inner wedges along a direction substantially perpendicular to a circumferential direction of the ring-shaped chamber.

10. The torsional vibration damper of claim 1, wherein the ring-shaped chamber is divided into at least two portions by a protrusion that is formed on the primary mass, and an oil passageway is formed on at least one side of the protrusion.

11. The torsional vibration damper of claim 1, wherein the outer wedge is configured to move in a radially outward direction so that the outer wedge contacts an outer surface of the ring-shaped chamber, and the inner wedge is configured to move in a radially inward direction so that the inner wedge contacts an inner surface of the ring-shaped chamber, when the elastic members are compressed.

12. The torsional vibration damper of claim 1, wherein at least one bushing is disposed between the primary mass and the secondary mass.

13. The torsional vibration damper of claim 1, wherein the ring-shaped chamber is at least partially filled with lubrication oil.

14. The torsional vibration damper of claim 1, further comprising a drive plate that is coupled to the secondary mass and is configured to compress the damping unit when a relative rotation between the primary mass and the secondary mass occurs.

15. The torsional vibration damper of claim 14, wherein at least two compression fins are provided on an outer circumference of the drive plate, the compression fins compressing the damping unit when the secondary mass relatively rotates with respect to the primary mass.

* * * * *